United States Patent
Tamai et al.

(10) Patent No.: US 9,855,531 B2
(45) Date of Patent: Jan. 2, 2018

(54) POLYMER MEMBRANE FOR WATER TREATMENT AND METHOD FOR MANUFACTURE OF SAME, AND WATER TREATMENT METHOD

(71) Applicant: SEKISUI CHEMICAL CO., LTD., Osaka (JP)

(72) Inventors: Toshihiro Tamai, Kyoto (JP); Naotaka Oyabu, Kyoto (JP); Saki Tanimura, Kyoto (JP); Takashi Osugi, Kyoto (JP); Ryuichi Matsuo, Kyoto (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 14/883,880

(22) Filed: Oct. 15, 2015

(65) Prior Publication Data

US 2016/0030892 A1 Feb. 4, 2016

Related U.S. Application Data

(63) Continuation of application No. 13/582,528, filed as application No. PCT/JP2011/054745 on Mar. 2, 2011, now abandoned.

(30) Foreign Application Priority Data

Mar. 4, 2010 (JP) ................................. 2010-047798

(51) Int. Cl.
*B01D 67/00* (2006.01)
*B01D 69/08* (2006.01)
(Continued)

(52) U.S. Cl.
CPC ....... *B01D 69/087* (2013.01); *B01D 67/0016* (2013.01); *B01D 69/02* (2013.01);
(Continued)

(58) Field of Classification Search
CPC combination set(s) only.
See application file for complete search history.

(56) References Cited

U.S. PATENT DOCUMENTS 2,586,970 A 2/1952 McDermott
2,659,102 A 11/1953 Rarick
(Continued)

FOREIGN PATENT DOCUMENTS

CN 101195083 6/2008
EP 1 338 328 8/2003
(Continued)

OTHER PUBLICATIONS

International Search Report dated Jun. 7, 2011 in International (PCT) Application No. PCT/JP2011/054745.
(Continued)

*Primary Examiner* — Krishnan S Menon
*Assistant Examiner* — Ryan B Huang
(74) *Attorney, Agent, or Firm* — Wenderoth, Lind & Ponack, L.L.P.

(57) ABSTRACT

A polymer membrane for water treatment, characterized in comprising a hollow fiber membrane having a self-supporting design composed of the substantially single principal structural material, with an outer diameter of 3.6 mm to 10 mm and a ratio of outer diameter to thickness, SDR, of 3.6 to 34.

3 Claims, 2 Drawing Sheets

(51) Int. Cl.

| | | |
|---|---|---|
| *B29C 47/00* | (2006.01) | |
| *B01D 69/02* | (2006.01) | |
| *C02F 3/12* | (2006.01) | |
| *C02F 1/44* | (2006.01) | |
| *B01D 71/30* | (2006.01) | |
| *D01D 5/02* | (2006.01) | |
| *B01D 61/14* | (2006.01) | |
| *B29L 31/00* | (2006.01) | |

(52) U.S. Cl.
CPC ............. *B01D 69/08* (2013.01); *B01D 71/30* (2013.01); *B29C 47/0066* (2013.01); *C02F 1/444* (2013.01); *C02F 3/1273* (2013.01); *B01D 61/145* (2013.01); *B01D 2325/04* (2013.01); *B01D 2325/24* (2013.01); *B29L 2031/755* (2013.01); *C02F 3/1268* (2013.01); *Y02W 10/15* (2015.05); *Y10T 29/49* (2015.01)

(56) References Cited

U.S. PATENT DOCUMENTS

| | | | | |
|---|---|---|---|---|
| 2,923,598 | A * | 2/1960 | Reis, Jr. | .................. D01D 5/06 |
| | | | | 15/159.1 |
| 2,965,437 | A * | 12/1960 | Blomberg | ................. D01F 6/72 |
| | | | | 264/184 |
| 3,975,478 | A * | 8/1976 | Leonard | ............... B01D 61/362 |
| | | | | 210/500.23 |
| 4,175,153 | A * | 11/1979 | Dobo | ..................... B01D 53/22 |
| | | | | 210/510.1 |
| 4,177,334 | A | 12/1979 | Okita | |
| 4,250,138 | A | 2/1981 | Okita | |
| 4,279,752 | A | 7/1981 | Sueoka et al. | |
| 4,286,015 | A | 8/1981 | Yoshida et al. | |
| 4,882,223 | A | 11/1989 | Aptel et al. | |
| 5,174,999 | A | 12/1992 | Magruder et al. | |
| 6,280,626 | B1 | 8/2001 | Miyashita et al. | |
| 6,322,703 | B1 | 11/2001 | Taniguchi et al. | |
| 6,325,938 | B1 | 12/2001 | Miyashita et al. | |
| 6,328,886 | B1 | 12/2001 | Miyashita et al. | |
| 6,802,971 | B2 | 10/2004 | Gorsuch et al. | |
| 7,022,238 | B2 | 4/2006 | Eguchi et al. | |
| 2002/0056682 | A1 | 5/2002 | Taniguchi et al. | |
| 2003/0015466 | A1* | 1/2003 | Ji | ...................... B01D 67/0011 |
| | | | | 210/500.25 |
| 2003/0026981 | A1* | 2/2003 | Kato | ......................... D01F 6/30 |
| | | | | 428/364 |
| 2003/0178369 | A1 | 9/2003 | Eguchi et al. | |
| 2004/0154986 | A1 | 8/2004 | Cheng et al. | |
| 2004/0185242 | A1 | 9/2004 | Charkoudian | |
| 2006/0196825 | A1* | 9/2006 | Chen | ................... B01D 67/0011 |
| | | | | 210/500.23 |
| 2008/0116128 | A1 | 5/2008 | Hashimoto et al. | |
| 2008/0156722 | A1 | 7/2008 | Suzuki et al. | |
| 2009/0305871 | A1 | 12/2009 | Perera et al. | |
| 2012/0097605 | A1 | 4/2012 | Tamai et al. | |

FOREIGN PATENT DOCUMENTS

| | | | |
|---|---|---|---|
| EP | 1 464 380 | | 10/2004 |
| EP | 2 452 741 | | 5/2012 |
| GB | 2006002509 | | 7/2006 |
| JP | 53-34868 | | 3/1978 |
| JP | 61-008150 | | 1/1986 |
| JP | 62-023403 | | 1/1987 |
| JP | 1-224004 | | 9/1989 |
| JP | 4-343707 | | 11/1992 |
| JP | 7-163849 | | 6/1995 |
| JP | 8-108053 | | 4/1996 |
| JP | 2000-051885 | | 2/2000 |
| JP | 2002-292254 | | 10/2002 |
| JP | 2003-147629 | | 5/2003 |
| JP | 2004-313923 | | 11/2004 |
| JP | 2005-081273 | | 3/2005 |
| JP | 2007-007488 | | 1/2007 |
| JP | 2007-500591 | | 1/2007 |
| JP | 2009-112895 | | 5/2009 |
| JP | 2009242984 | A * | 10/2009 |
| JP | 2010-082509 | | 4/2010 |
| KR | 10-2003-0068017 | | 8/2003 |
| KR | 10-2003-0068017 | | 10/2004 |
| TW | I277440 | | 8/2006 |
| WO | 00/63122 | | 10/2000 |
| WO | 2007/007051 | | 1/2007 |
| WO | 2011/004786 | | 1/2011 |

OTHER PUBLICATIONS

M. Bodzek et al., "Modelling of the Ultrafiltration of Electrophoretic Emulsion Paint", Desalination, vol. 94, pp. 261-272, 1994.
Australian Office Action dated Jan. 16, 2015 in corresponding Australian Application No. 2011221916.
Extended European Search Report dated Feb. 10, 2017 in corresponding European Application No. 11750688.1.
Database WPI, Week 200401, Thomson Scientific, London, GB; AN 2004-007457, XP002766487, Aug. 19, 2013.
Database WPI, Week 200908, Thomson Scientific, London, GB; AN 2009-B25433, XP002766488, Jun. 11, 2008.
Office Action dated Sep. 28, 2017 in corresponding Indian Application No. 8283/DELNP/2012.

* cited by examiner

[Figure 1]
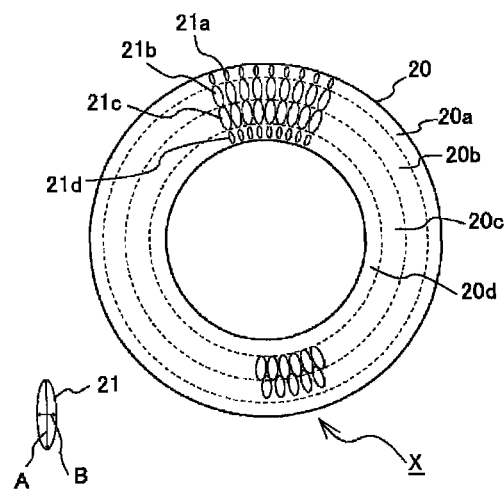
[Figure 2]
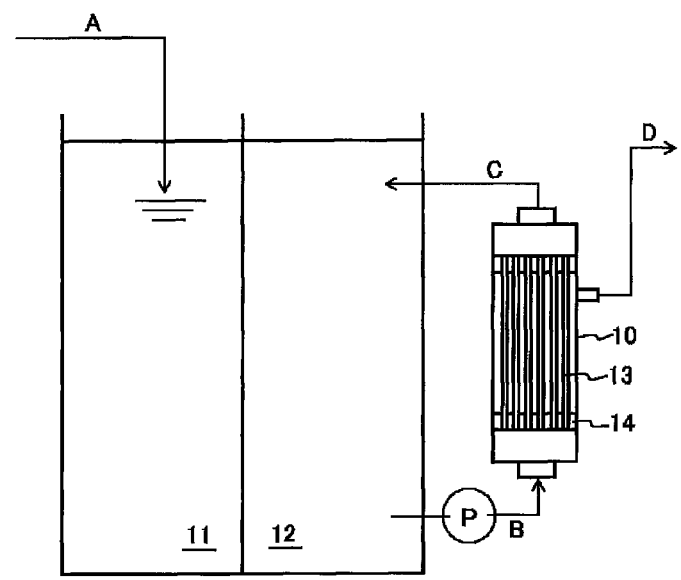

[Figure 3]
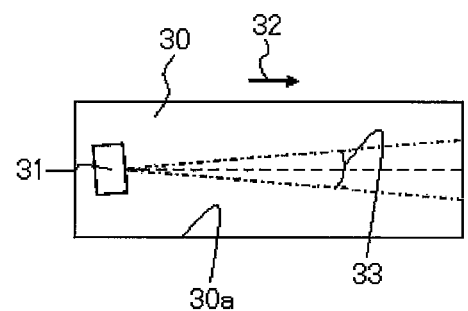
[Figure 4]
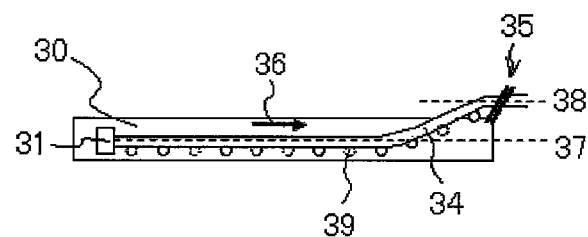
[Figure 5]
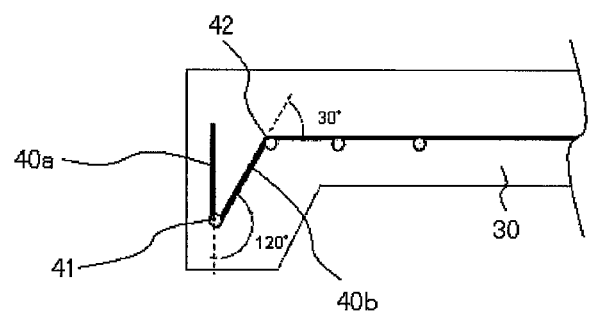

POLYMER MEMBRANE FOR WATER TREATMENT AND METHOD FOR MANUFACTURE OF SAME, AND WATER TREATMENT METHOD

TECHNICAL FIELD

The present invention relates to a polymer membrane for water treatment a method for the manufacture of same, and a water treatment method.

BACKGROUND ART

Conventionally, polymer membranes for water treatment are used for purifying water, for example, for removing turbidity from river water and groundwater, clarification of industrial water, treatment of wastewater and sewage, and as a pretreatment for seawater desalination, and the like.

Usually, such polymer membranes for water treatment are used as separation membranes in water treatment devices that utilize porous hollow fiber membranes formed from various polymer materials such as, for example, polystyrene (PS), poly(vinylidene fluoride) (PVDF), polyethylene (PE), cellulose acetate (CA), polyacrylonitrile (PAN), poly(vinyl alcohol) (PVA), polyimide (PI), and the like. In particular, polysulfone resins are frequently used due to their superior mechanical and chemical properties such as heat resistance, acid resistance, alkali resistance, and the like, and from the additional perspective of the ease of making a membrane.

By supplying contaminated water under pressure to micropores, porous hollow fiber membranes can remove contaminating substances from water by capturing only contaminating substances of a certain size or larger. In general, examples of the properties that are required in such polymer membranes for water treatment, in addition to the goal of separation characteristics, include having superior water permeability and superior physical strength, high stability toward a variety of chemical substances (namely, chemical resistance), less likelihood of adhesion of impurities during filtration (namely, superior antifouling properties), and the like.

For example, cellulose acetate fiber hollow-fiber separation membranes have been proposed that have comparatively high water permeability and are less likely to become contaminated even when used for long periods (see Patent Document 1).

However, this cellulose acetate hollow-fiber separation membrane has low mechanical strength and its chemical resistance is inadequate. Consequently, there is a problem in that when the separation membrane becomes contaminated, cleaning employs physical means or chemical means using chemical products and is extremely difficult.

Additionally, polymer membranes for water treatment have been proposed using hollow fiber membranes formed from poly(vinylidene fluoride) resin that have both superior physical strength and chemical resistance (see Patent Document 2). This polymer membrane for water treatment can be used by direct immersion in an aeration tank, and can be cleaned using various chemical agents even when contaminated.

However, poly(vinylidene fluoride) tends to have comparatively weak hydrophilic properties, with low antifouling properties.

The use of submersion-type MBRs (membrane bioreactors) have frequently been used in sewer water treatment in recent years (see Patent Documents 3 and 4). This submersion-type MBR is a method to obtain treated water by suction filtration using hollow fiber-type or flat-type water treatment membranes immersed in a biological water treatment tank, and the membrane surfaces are cleaned by continuous aeration to prevent the reduction in filtration efficiency when contaminants are deposited on the outer surface of the membrane.

However, the energy for the required aeration in immersion-type MBRs is associated with substantial electrical energy costs, which causes an increase in running costs.

In addition, depending on the particular application, water treatment is differentiated into inside-out filtration and outside-in filtration. For example, when the filtered liquid is already high-purity tap water, inside-out filtration is used and high-pressure water is supplied to hollow-fiber membranes with a small inner diameter. In this way, water treatment at a high filtration rate is possible. On the other hand, to prevent the occlusion inside the membrane by turbidity components when high-turbidity water is filtered, the operational method used for carrying out the water treatment employs low pressure using either a tubular membrane with a large pore diameter made from a composite material on a support frame or a flat membrane, and either an air flow or water flow is supplied to the membrane outer surface to prevent the deposition of the turbidity components on the membrane surface.

Furthermore, an inside-out type (outside the tank type) MBR has been proposed in which bio-treated water flows into a hollow-fiber membrane that is installed in a water bio-treatment tank and the filtration is carried out using internal pressure. In a water treatment membrane module that employs this inside-out mode MBR, a tubular-shaped water treatment membrane with an inner diameter of about 5 to 10 mm is used so that no occlusion will occur due to deposition of solids at the module end surface caused by bio-treated water that contains solids of varying sizes.

However, the treatment rate frequently cannot be accommodated due to problems with pressure resistance with flat-membrane filtration, and equipment other than the raw water pump and energy are required as a solution for preventing the deposition of turbidity components on the membrane surface.

Additionally, as a consequence of the increase in inner diameter of the water treatment membrane, treatment using a tubular membrane requires a firm support frame or an increase in membrane thickness to reduce the resistance to internal pressure during treatment. On the other hand, when using a support frame, generally back-pressure washing (backwashing) of the hollow-fiber membrane is carried out when the treatment rate decreases due to deposition of contaminants such as turbidity components and the like on the membrane surface, but damage can readily occur in this way when the tubular membrane that is attached to the support frame peels away. In particular, backwashing is practically impossible in an inside-out filtration-type tubular membrane that is suitable for the treatment of water with high suspended substances content. Consequently, in methods other than backwashing, a sponge ball is used to prevent a decrease in water permeation rate, a high internal flow rate is maintained, and the like, complication of the system and an increase in energy expenditures is currently unavoidable.

Moreover, when the water treatment membrane thickness is increased, this leads to the new problem of decreasing the footprint efficiency based on the water treatment rate.

Furthermore, in a method for manufacturing porous hollow-fiber membranes, conventionally, a resin solution comprising resin and solvent passes into a double-tube-type mold and a non-solvent is used to direct coagulation water to an interior part that will become a hollow part, and the non-solvent induced phase separation method (NIPS method) is applied to carry out phase separation by immersion of the outer part in a coagulation bath (for example, Patent Document 5). In this method, the resin solution leaving the mold is once brought into contact with air, and the solvent in the resin solution evaporates to form a skin layer. For this reason, the resin solution is submersed in the coagulation tank by dropping vertically due to gravity, and thereafter the membrane obtained by coagulation of the resin component in the coagulation tank is passed along a guide such as a roller, transferred to a different machine direction, and finally positioned horizontally in the machine direction and cut.

However, making the pore diameter in the porous hollow-fiber membrane larger can produce cracks, swelling, warping, uneven thicknesses, and the like. In addition, the take-up becomes difficult, and the manufacture of homogeneous hollow-fiber membranes, such as with a flattened membrane shape or the like, becomes extremely difficult, with the result that there are also problems in obtaining a polymer membrane for water treatment in which the abovementioned characteristics can be adequately achieved.

PRIOR ART DOCUMENTS

Patent Document

[Patent Document 1] JP H8-108053-AA
[Patent Document 2] JP 2003-147629-A
[Patent Document 3] JP 2000-051885-A
[Patent Document 4] JP 2004-313923-A
[Patent Document 5] JP 2010-82509-A

DISCLOSURE OF THE INVENTION

Problem to be Solved

As mentioned above, there is a strong demand for polymer membranes for water treatment that can satisfy all the requirements such as having superior water permeability, superior physical strength, high chemical resistance, and superior antifouling properties.

Additionally, it is desirable to establish a method for manufacture wherein a membrane that can adequately achieve such characteristics can be manufactured easily and reliably.

Taking account of the aforementioned problems, the object of the present invention is to provide a polymer membrane for water treatment that maintains mechanical strength, water permeability, and the like, while increasing the water treatment efficiency, and a method for manufacture of a polymer membrane for water treatment wherein the manufacture is easy and reliable, and a water treatment method that can realize efficient water treatment and maintenance.

MEANS TO SOLVE THE PROBLEM

As the result of diligent study of increasing footprint efficiency as applied to an inside-out mode MBR, by focusing on the strength of the water treatment membrane and how to improve same, the present inventors discovered that they could obtain a water treatment membrane that suitably achieved the abovementioned tradeoff between the two characteristics.

In other words, using an appropriate design for the SDR value specified by the ratio between the outer diameter and the thickness, and an appropriate design for the porosity that is apparent from the cross-section, they discovered they could obtain a water treatment membrane with an inner diameter larger than conventional hollow-fiber membranes and could obtain adequate resistance to the internal and external pressures associated with filtration operations.

Furthermore, in the membrane manufacture steps, as a result of conducting a diligent study of the reactions and actions of a resin solution in a coagulation tank, the method of transfer of the membrane obtained, and the like, the present inventors discovered a method by which they could simply and reliably manufacture a membrane that would adequately achieve the abovementioned characteristics in a spinning state under specified conditions and/or with transfer/recovery of the membrane under specified conditions, and thereby accomplished the present invention.

That is, polymer membrane for water treatment according to the present invention, characterizes in comprising a hollow fiber membrane having a self-supporting design composed of the substantially single principal structural material,
    with an outer diameter of 3.6 mm to 10 mm and
    a ratio of outer diameter to thickness, SDR, of 3.6 to 34.
    Such polymer membrane for water treatment preferably has one or more below.
    In that in the cross-section in the radial direction of the hollow fiber membrane;
    (a) the porosity based on the hollow fiber membrane cross-sectional area is 30-85%,
    (b) the pores with a short axis dimension of 10-100 μm are 80% or more of the total pore surface area, and
    (c) there is a laminar distribution from the center in the radial direction of the innermost layer, inner layer, outer layer and outermost layer, and the long axis dimension of the pores in each of the inner layer and outer layer comprises 20-50% of the thickness, while the long axis dimension of the pores in each of the innermost layer and outermost layer comprises 0-20% of the thickness.
    The polymer membrane has the fractionation property of an ultrafiltration membrane or a microfiltration membrane.
    The polymer membrane has;
    an internal pressure resistance of 0.3 MPa or greater,
    an external pressure resistance of 0.1 MPa or greater, and
    pure water flux of 100 L/m$^2$·hr·atm or greater.
    The main structural material is poly(vinyl chloride), chlorinated poly(vinyl chloride), or a vinyl chloride-chlorinated vinyl chloride copolymer.
    The degree of polymerization of the vinyl chloride resin is 250-3000.
    The chlorine content in the vinyl chloride resin is 56.7 to 73.2%.
    The mass ratio of vinyl chloride monomer units in the vinyl chloride resin amounts to 50-99 mass %.
    A method for the manufacture of a polymer membrane for water treatment has;
    preparing a resin solution from a substantially single material, and
    coagulating the resin solution by discharging from a discharge port into a coagulation tank at within ±30° of horizontal with respect to the ground.
    Such method for the manufacture preferably has one or more below.
    The method has
    preparing a resin solution composed of the substantially single principal structural material, and coagulating the resin solution by discharging from a discharge port in which a discharge direction of the resin solution is in a horizontal direction with respect to the ground into a coagulation tank.

Using a spinneret provided with a discharge port, where the discharge port discharges the resin solution in an immersed state into a coagulation tank that contains a non-solvent.

The method further has;

cutting the membrane obtained within the tank, or cutting the membrane outside the tank at a position higher than the discharge port.

The difference in specific gravity between the resin solution and the non-solvent is within 1.0.

A method for water treatment of the present invention characterizes that the polymer membrane for water treatment described above is used as a separation membrane or that separating water is performed by passing microbiological treated wastewater using activated sludge inside the polymer membrane for water treatment described above.

Effect of the Invention

According to the present invention, the present invention is possible to provide a polymer membrane for water treatment that maintains mechanical strength, water permeability, and the like, while increasing the water treatment efficiency.

Also, using the method of the present invention is possible to manufacture the polymer membrane for water treatment which can be successfully satisfy the above properties.

Further, using the polymer membrane for water treatment can realize efficient water treatment and maintenance.

BRIEF EXPLANATION OF DIAGRAMS

FIG. 1 A schematic diagram that describes a cross-section along the radial direction of a polymer membrane for water treatment of the present invention.

FIG. 2 A conceptual diagram that describes an inside-out mode MBR using a water treatment unit equipped with a polymer membrane for water treatment of the present invention.

FIG. 3 A schematic diagram that describes the discharge angle for the resin solution in a method for manufacturing a polymer membrane for water treatment of the present invention.

FIG. 4 A schematic diagram that describes the steps from discharge of the resin solution to cutting of the membrane in a method for manufacturing a polymer membrane for water treatment of the present invention.

FIG. 5 A schematic diagram that describes the take-up of the resin solution in a comparative example.

DETAILED DESCRIPTION OF THE PREFERRED EMBODIMENTS

The polymer membrane for water treatment of the present invention is primarily a membrane composed of a hollow-fiber membrane that has a self-supporting structure using a substantially single principal structural material.

(Form/structure)

In other words, the polymer membrane for water treatment of the present invention is a hollow-fiber membrane that has a single-layer structure formed with a substantially single principal structural material.

Here, a single-layer structure means being formed from a single material. Usually, if weak materials are not strengthened through the formation of composite materials with structural supporting bodies that are stronger materials (ceramics, nonwoven fabrics, and the like), they cannot be maintained in any desired shape, for example a cylinder, tube, or the like. Consequently, in addition to the materials that form the membrane, to maintain the desirable shape while being used as a water treatment membrane, conventional water treatment membranes with relatively large pore diameters are associated with tubular ceramics, or nonwoven fabrics formed into a tubular shape, or the like, as structural frames to support the membrane.

On the other hand, the polymer membrane for water treatment of the present invention is formed only from a hollow-fiber membrane, and is not accompanied by a support frame formed from different ingredients or materials (for example, nonwoven fabric, paper, metal, ceramics, and the like) which do not change a desirable shape such as a tube. In other words, this means that the polymer membrane for water treatment of the present invention is formed in a single-layer structure, and a laminated structure using different ingredients or materials is not used. Nevertheless, even such a structure must have sufficient strength to maintain the desired shape such as a cylinder, tube, or the like for use as a water treatment membrane. In other words, it has "a self-supporting property/structure". Consequently, a support frame-less membrane with large pore diameter can be realized. For this reason, superior water permeability can be maintained even during backwashing, without the portion of the membrane responsible for the filtration capability separating from the structural support frame, which moreover differs from tube-shaped membranes and the like that use structural support frames of ceramics or the like.

In addition, as mentioned above, substantially single principal structural material means that it has been formed from substantially a single material. Substantially single material means the principal structural material is of one type. In other words, this means that in the material that forms the polymer membrane for water treatment (for example, resin of which the polymer membrane for water treatment is constituted), one type of resin accounts for 50 mass % or more (preferably 60 mass % or more, more preferably 70 mass % or more), and means that the properties of this one type of resin control the properties of the structural material. Specifically, one type of resin means a material accounting for 50 to 99 mass %.

Furthermore, for a single material and a single principal structural material, during the manufacture of the vinyl chloride resin described below, during the manufacture of the hollow-fiber membrane mentioned below, the design doesn't include the additives normally used.

An example of a hollow-fiber membrane is a membrane with an outer diameter of about 3.6 to 10 mm and a thickness of about 0.15 to 2.4 mm.

The strength of a hollow-fiber membrane is determined by various factors such as the material, inner diameter, thickness, circularity, internal structure, and the like, among which the use of the SDR value (value calculated as the ratio of the outer diameter and the thickness) was discovered to be effective. In other words, in the results from various experiments carried out, it was found necessary to design for an SDR value of about 34 or less to achieve a resistance to an internal/external pressure of 0.3 MPa. On the other hand, a design in which the SDR value was reduced was linked to a reduction in the membrane filtration area in the water treatment module. Consequently, from the perspective of ensuring balance therebetween, an SDR of about 3.6 or greater is preferred.

Among these, about 4.0 or greater is preferred and about 20 or less is preferred, and about 16 or less, or about 11 or less is further preferred. In particular, it is preferable to establish an SDR of about 4 to 16 when the outer diameter is about 5 to 7 mm, and about 6.5 to 11 is further preferred.

Furthermore, the inner diameter is determined by its outer diameter and thickness, but in the example of about 1.6 to 9.4 mm, 4 mm to 8 mm is suitable, and in this case the thickness is preferably about 0.1 mm to 2 mm.

Consequently, in concrete terms, for the polymer membrane for water treatment of the present invention, examples include (1) a membrane that comprises a hollow-fiber membrane having a self-supporting structure from using a substantially single principal structural material will have an outer diameter of 3.6 mm to 10 mm and an SDR value of 3.6 to 34.

Among these, an outer diameter of about 5 to 7 mm and an SDR value of about 6.5 to 11 are preferred. For this reason, the hollow-fiber membrane maintains its strength when internal or external pressure is applied, and a large inner diameter is maintained and the interior of the hollow fiber does not become occluded when the water throughflow has highly concentrated waste water.

Furthermore, the membrane inner and outer diameters, thickness, and the like, can be measured from the actual dimensions by using electron microphotography.

In addition, examples include (2) a membrane that comprises a hollow-fiber membrane having a self-supporting structure from using a substantially single principal structural material will have an inner diameter of 3 to 8 mm and an SDR value of 4 to 13, (3) a membrane that comprises a hollow-fiber membrane having a self-supporting structure from using a substantially single principal structural material will have an inner diameter of 1.6 mm to 9.4 mm, and a thickness of 0.15 mm to 2.4 mm.

The polymer membrane for water treatment is preferably a porous membrane having a plurality of micropores in its surface. The average pore diameter of these micropores, for example, is about 0.001 to 10 μm, preferably about 0.01 to 1 μm. The size and density of micropores in the membrane surface can be suitably adjusted using the abovementioned inner diameter, thickness, the intended characteristics and the like, for example, these can be suitable to achieve enough water permeability as mentioned below. Thus, by such micropores being numerous, along with serving the function of being a water permeable membrane, using the micropore size, density, and the like can be adjusted, for example, for the fractionation properties of an ultrafiltration membrane or a microfiltration membrane. Furthermore, it is generally known that in general, ultrafiltration membranes have pore sizes of about 2 to 200 nm, while microfiltration membranes have pore sizes of about 50 nm to 10 μm.

The porosity is, for example, about 10 to 90%, and is preferably about 20 to 80%. Here, porosity means the proportion of the total pore area vs. the total area of the polymer membrane for water treatment from an arbitrary horizontal cross-section (radial cross section of a hollow fiber, same below), for example, determined by a method of calculating the respective areas from a microphotograph of a horizontal cross-section of the membrane.

For example, in the radial cross-section of a hollow fiber as in the abovementioned (1), (a) the porosity based on the cross-sectional area of the aforementioned hollow-fiber membrane is preferably about 30 to 85%, and about 50 to 85%, about 40 to 75%, or about 50 to 75% are further preferred.

Additionally, (b) pores with a short axis dimension of 10 to 100 μm are preferably about 80% or more of the total pore surface area, and about 83% or more, about 85% or more, or about 87% or more, are further preferred.

It is furthermore preferable that, (c) there is a laminar distribution of pores constituting the innermost layer, inner layer, outer layer and outermost layer from the center in the radial direction, and the long axis dimension of the pores in the aforementioned inner layer and outer layer respectively accounts for 20 to 50% of the thickness, while the long axis dimension of the pores in each of the aforementioned innermost layer and outermost layer respectively accounts for 0 to 20% of the thickness. For this reason, it is possible to disperse the stress concentration when internal or external pressures are applied to the hollow-fiber membrane, and to preserve the strength of the entire membrane while preserving the water permeation properties.

In other words, in FIG. 1 that shows a radial cross-section of hollow fiber membrane 20, pores 21 are constituted in relatively orderly layers so that the long axis will match the radial orientation, and are respectively arranged/distributed so as to be constituted from innermost layer 20d, inner layer 20c, outer layer 20b, and outermost layer 20a. The arrangement/distribution in this case can have the various layers clearly separated and can be approximately independent, but pores 21 constituted in one layer can be partially nested to overlap with pores 21 constituted in another layer (see X in FIG. 1).

Furthermore, the distribution of pores in such layers can be observed/measured using electron microphotography.

Pores 21d are distributed in innermost layer 20 of a hollow-fiber membrane, likewise pores 21c in inner layer 20c, pores 21b in outer layer 20b, and pores 21a in outermost layer 20a, respectively. As the size of pores 21 in each layer, for example, long axis A and/or short axis B as shown in FIG. 1 are preferably relatively aligned for each layer within about ±30%. In particular, the long axis dimension of pores 21c and 21b in inner layer 20c and outer layer 20b preferably amount to, respectively, about 20 to 50% of the thickness and about 25 to 45% of the thickness. The corresponding average long axis dimension of pores 21c and 20b, for example, are preferably relatively aligned to about ±30%, and further preferably about ±15%. Additionally, the long axis dimension of pores 21d and 21a in innermost layer 20d and outermost layer 20a preferably amount respectively to about 0 to 20% of the thickness and about 5 to 15% of the thickness. The corresponding average long axis dimension of pores 21d and 20a, for example, are preferably relatively aligned to about ±30%, and further preferably about ±15%.

(Ingredients/materials)

The polymer membrane for water treatment of the present invention is formed from a substantially single principal structural material, and ingredients and materials used in the art can be employed as this principal structural material, among these, vinyl chloride resins are suitable.

Examples of vinyl chloride resins include vinyl chloride homopolymers, copolymers of vinyl chloride monomer with copolymerizable monomers that have an unsaturated bond, graft copolymers wherein vinyl chloride monomer is graft copolymerized onto a polymer, (co)polymers derived by chlorination of the vinyl chloride monomer units of such materials, and the like. These can be used singly, or two or more types can be combined for use. In particular, to improve the antifouling properties, it is suitable for a hydrophilic monomer to be copolymerized.

Chlorination of the vinyl chloride monomer units can be carried out before the polymerization or after the polymerization.

Moreover, in the case of a vinyl chloride copolymer (including chlorinated vinyl chloride), the content of monomer units other than vinyl chloride monomer units (including chlorinated vinyl chloride) is within the range that does not inhibit the primary characteristics, and is 50 mass % or more of vinyl chloride-derived units (including units derived from chlorinated vinyl chloride), for example, a content of 50-99 mass % is preferred (the mass calculation here does not include plasticizers in the vinyl chloride resin or other polymers that are blended into said copolymer resin).

Other monomers or polymers can be blended into the vinyl chloride resin. In particular, to increase the antifouling properties, it is preferable to blend in a hydrophilic monomer-containing copolymer or a hydrophilic polymer. In this case, the vinyl chloride resin is contained amounts to 50 mass % or more (preferably 60 mass % or more, further preferably 70 mass % or more) based on the total resin constituting the membrane, and the monomer or polymer which is blended in is contained amounts to less than 50 mass % based on the total resin constituting the membrane.

Examples of the copolymerizable monomers, that have an unsaturated bond, with vinyl chloride monomer include, for example, (meth)acrylic acid derivatives such as methyl(meth)acrylate, ethyl(meth)acrylate, n-propyl(meth)acrylate, isopropyl(meth)acrylate, n-butyl(meth)acrylate, isobutyl(meth)acrylate, t-butyl(meth)acrylate, n-pentyl(meth)acrylate, neopentyl(meth)acrylate, cyclopentyl(meth)acrylate, n-hexyl(meth)acrylate, cyclohexyl(meth)acrylate, n-octyl(meth)acrylate, isooctyl(meth)acrylate, 2-ethylhexyl(meth)acrylate, n-decyl(meth)acrylate, isodecyl(meth)acrylate, lauryl(meth)acrylate, tridecyl(meth)acrylate, stearyl(meth)acrylate, isostearyl(meth)acrylate, behenyl(meth)acrylate, phenyl(meth)acrylate, toluyl(meth)acrylate, xylyl(meth)acrylate, benzyl(meth)acrylate, 2-ethoxyethyl(meth)acrylate, 2-butoxy(meth)acrylate, 2-phenoxy(meth)acrylate, 3-methoxypropyl(meth)acrylate, 3-ethoxypropyl(meth)acrylate, and the like;

α-olefins such as ethylene, propylene, butylene, and the like;

vinyl esters such as vinyl acetate, vinyl propionate, and the like;

vinyl ethers such as butyl vinyl ether, cetyl vinyl ether, and the like;

aromatic vinyl compounds such as styrene, α-methylstyrene, and the like;

vinyl halides such as vinylidene chloride, vinylidene fluoride, and the like;

N-substituted maleimides such as N-phenylmaleimide, N-cyclohexylmaleimide, and the like;

(meth)acrylic acid, maleic anhydride, acrylonitrile, and the like.

These can be used singly, or 2 or more types can be combined for use.

For example, it is favorable with vinyl acetate, acrylic ester, ethylene, propylene, vinylidene fluoride to copolymerize or to blend in order to give further flexibility and anti-pollution characteristics, chemical resistance.

Examples of polymers that are graft-polymerized with vinyl chloride, although not limited as long as they can be graft-polymerized with vinyl chloride, include ethylene/vinyl acetate copolymers, ethylene/vinyl acetate/carbon monoxide copolymers, ethylene/ethyl acrylate copolymers, ethylene/butyl acetate/carbon monoxide copolymers, ethylene/methyl methacrylate copolymers, ethylene/propylene copolymers, acrylonitrile/butadiene copolymers, polyurethanes, chlorinated polyethylene, chlorinated polypropylene, and the like. These can be used singly, or 2 or more types can be combined for use.

Also, a crosslinkable monomer can be used as the monomer material constituting the polymer membrane. Examples of the crosslinkable monomer include (meth)acrylic esters of the polyol such as ethylene glycol di(meth)acrylate, diethylene glycol di(meth)acrylate, polyethylene glycol di(meth)acrylate, propylene glycol di(meth)acrylate, dipropylene glycol di(meth)acrylate, polypropylene glycol di(meth)acrylate, 1,2-butylene glycol di(meth)acrylate, 1,3-butylene glycol di(meth)acrylate, neopentyl glycol di(meth)acrylate, glycerin di(meth)acrylate, glycerin tri(meth)acrylate, trimethylolpropane tri(meth)acrylate, pentaerythritol tetra(meth)acrylate, and the like;

acrylic amides such as N-methyl allyl acrylic amide, N-vinyl acrylic amide, N,N'-methylene bis(meth)acrylic amide, bisacrylic amide acetate;

divinyl compounds such as divinylbenzene, divinyl ether, divinyl ethylene urea, and the like;

polyallyl compounds such as diallyl phthalate, diallyl maleate, diallylamine, triallyl amine, triallyl ammonium salt, allyl-etherified compounds of pentaerythritol, allyl-etherified compounds of sucrose which has at least two allyl ether units in the molecule, and the like; and (meth)acrylic esters of unsaturated alcohol such as vinyl (meth)acrylate, allyl(meth)acrylate, 2-hydroxy-3-acryloyloxypropyl(meth)acrylate, 2-hydroxy-3-acryloyloxypropyl(meth)acrylate, and the like.

Examples of the hydrophilic monomers include, for examples, (1) cationic group-containing vinyl monomers and/or salts thereof (hereinafter may be referred to as "cationic monomer") such as amino group, ammonium group, pyridyl group, imino group, betaine structure;

(2) hydrophilic non-ionic group-containing vinyl monomers and/or salts thereof (hereinafter may be referred to as "non-ionic monomer") such as hydroxyl group, amido group, ester structure, ether structure;

(3) anionic group-containing vinyl monomers and/or salts thereof (hereinafter may be referred to as "anionic monomer") such as carboxyl group, sulfonate group, phosphoric acid group;

(4) other monomers, or the like.

Specifically, (1) examples of the cationic monomer include (meth)acrylic ester or (meth)acrylic amide which has a dialkyl amino group having carbon number of 2-44 such as dimethylamino ethyl(meth)acrylate, diethylamino ethyl(meth)acrylate, dipropylamino ethyl(meth)acrylate, diisopropyl amino ethyl(meth)acrylate, dibutyl amino ethyl(meth)acrylate, diisobutyl amino ethyl(meth)acrylate, di t-butyl amino ethyl(meth)acrylate, dimethylamino propyl(meth)acrylic amide, diethylamino propyl(meth)acrylic amide, dipropylamino propyl(meth)acrylic amide, diisopropyl amino propyl(meth)acrylic amide, dibutyl amino propyl(meth)acrylic amide, diisobutyl aminopropyl(meth)acrylic amide, di t-butyl amino propyl(meth)acrylic amide, and the like;

styrene having total carbon number of 2-44 dialkyl amino group such as dimethylamino styrene, dimethylamino methyl styrene, and the like;

vinyl pyridine such as 2- or 4-vinyl pyridine, and the like;

N-vinyl heterocyclic compounds such as N-vinyl imidazole, and the like;

acid-neutralizing compounds of amino group-containing monomers such as vinyl ether, for example, aminoethyl vinyl ether, dimethylamino ethyl vinyl, or quaternized compounds in which the monomers thereof are quaternized by halogenated alkyl (carbon number of 1-22), halogenated benzyl, alkyl (carbon number of 1-18) or aryl (carbon number of 6-24) sulfonic acid or dialkyl (total carbon number of 2-8) sulfate, and the like;

vinyl monomers having a diallyl-type quaternized ammonium salt such as dimethyl diallyl ammonium chloride, diethyl diallyl ammonium chloride, and the like, or having a betaine structure such as N-(3-sulfopropyl)-N-(meth)acryloyloxyethyl-N,N-dimethyl ammonium betaine, N-(3-sulfopropyl)-N-(meth)acryloyl amide propyl-N,N-dimethyl ammonium betaine, N-(3-carboxymethyl)-N-(meth)acryloyl amido propyl-N,N-dimethyl ammonium betaine, N-carboxymethyl-N-(meth)acryloyloxyethyl-N,N-dimethyl ammonium betaine, and the like.

Among these cationic groups, amino group-containing and ammonium group-containing monomers are preferable.

(2) examples of the non-ionic monomer include vinyl alcohol;

(meth)acrylic ester or (meta) acrylic amide which have a hydroxy alkyl (carbon number of 1-8) such as the N-hydroxypropyl(meth)acrylic amide, hydroxyethyl(meth)acrylate, N-hydroxypropyl(meta)acrylic amide, and the like;

polyol(meth)acrylic ester such as polyethylene glycol (meth)acrylate (a degree of polymerization of ethylene glycol:1-30), and the like;

(meth)acrylic amide;

alkyl (carbon number of 1-8) (meth)acrylic amide such as N-methyl(meth)acrylic amide, N-n-propyl(meth)acrylic amide, N-isopropyl(meth)acrylic amide, N-t-butyl(meth) acrylic amide, N-isobutyl(meth)acrylic amide, and the like;

dialkyl (total carbon number of 2-8) (meth)acrylic amide such as N,N-dimethyl(meth)acrylic amide, N,N-diethyl (meth)acrylic amide, N,N-dimethyl acrylic amide, N,N-diethyl acrylic amide, and the like;

diacetone (meth)acrylic amide;

N-vinyl cyclic amide such as N-vinyl pyrrolidone, and the like;

(meth)acrylic ester having alkyl (carbon number of 1-8) group such as methyl(meth)acrylate, ethyl(meth)acrylate, n-butyl(meth)acrylate, and the like;

(meth)acrylic amide having cyclic amido group such as N-(meth)acryloyl morpholine, and the like.

Among these, vinyl alcohol, (meth)acrylic amide monomer and hydroxy alkyl group (carbon number of 1-8)-containing (meth)acrylic ester described above, (meth) acrylic ester of polyol described above are preferable.

(3) examples of the anionic monomer include carboxylic acid monomer having polymeric unsaturated group such as (meta) acrylic acid, maleic acid, itaconic acid, etc. and/or acid anhydride (in cases where having carboxyl groups more than two in one monomer);

sulfonic acid monomer having polymeric unsaturated group such as styrene sulfonic acid, 2-(meth)acrylic amide-2-alkyl (carbon number of 1-4) propanesulfonic acid, and the like;

phosphate monomer having polymeric unsaturated group such as vinyl phosphonic acid, (meth)acryloyloxy alkyl (carbon number of 1-4) phosphoric acid, and the like.

The anionic group may be neutralized in any neutralization degree by basic substance. In this case, all anionic groups or part of anionic group in the polymer produce salts.

Examples of a positive ion in the salt include ammonium ion, trialkyl ammonium ion having total carbon number of 3-54 (e.g., trimethyl ammonium ion, triethyl ammonium ion), hydroxy alkyl ammonium ion having carbon number of 2-4, dihydroxy alkyl ammonium ion having total carbon number of 4-8, tri hydroxy alkyl ammonium ion having total carbon number of 6-12, alkali metal ions, alkaline earth metals ion, and the like.

Neutralization may be performed with a monomer and after making a polymer.

(4) Other than the vinyl monomers described above, monomers may include a monomer having the active site that is hydrogen-bondable such as N-vinyl-2-pyrrolidone, hydroxyethyl methacrylate, hydroxyethyl acrylate, and the like.

Without being limiting in any particular way, any desired conventionally-known polymerization method can be employed as the abovementioned method for manufacturing vinyl chloride resins. Examples thereof include bulk polymerization, solution polymerization, emulsion polymerization, suspension polymerization, and the like.

Without being limiting in any particular way, chlorination methods that can be used include methods that are well known in the art, such as are described in Japanese Published Unexamined Patent Application No. H09-278826, Japanese Published Unexamined Patent Application No. 2006-328165, World Patent WO/2008/62526, and the like. A chlorine content of 56.7 to 73.2% in the vinyl chloride resin is preferred. A chlorine content of 58 to 73.2% in the chlorinated vinyl chloride resin is satisfactory, 60 to 73.2% is preferred, and 67 to 71% is further preferred.

The degree of polymerization of the vinyl chloride resin is preferably 250-3000, and further preferably 500-1300. If the degree of polymerization is too low, the solution viscosity during spinning will decrease, which will be problematic for the membrane manufacturing operation, and the water treatment membrane made therefrom will tend to lack strength. On the other hand, a degree of polymerization that is too high will cause the viscosity to be too high and tends to result in residual bubbles in the water treatment membrane that has been manufactured. Here, the degree of polymerization means a measured value that complies with JIS K 6720-2.

To adjust the degree of polymerization to be within the abovementioned range, it is preferable to make suitable adjustments to conditions that are well known in the art, such as in reaction time, reaction temperature, and the like.

The polymer membrane for water treatment of the present invention, inter alia, is preferably formed from poly(vinyl chloride) (homopolymer), poly(chlorinated vinyl chloride) (homopolymer), or copolymers of vinyl chloride and chlorinated vinyl chloride.

However, with the goal of increasing moldability, heat stability, or the like at forming membrane, within a range that does not damage the effect of the present invention, additives such as lubricants, heat stabilizing agents, membrane formation aids, or the like, can also be blended into the vinyl chloride resin constituting the polymer membrane for water treatment of the present invention. These can be used singly, or two or more types can be used in combination.

Examples of lubricants include stearic acid, paraffin wax, and the like.

Examples of heat stabilizing agents generally used in the formation of vinyl chloride resins include tin, lead, and Ca/Zn stabilizers, and the like.

Examples of membrane formation aids include hydrophilic polymers such as poly(ethylene glycol), polyvinylpyrrolidone, and the like, with various degrees of polymerization.

(Properties)

At a transmembrane pressure difference of 100 kPa, a pure water flux of about 100 L/(m²·h) or more, or about 200 L/(m²·h) or more is suitable for polymer membranes for water treatment of the present invention, and about 600 L/(m²·h) or more is preferred, about 800 L/(m²·h) or more is further preferred, and about 1000 L/(m²·h) or more is still further preferred.

In addition, the membrane internal pressure resistance is preferably about 0.3 MPa or more, and about 0.35 MPa or more or about 0.4 MPa or more is further preferred.

The external pressure resistance of the membrane is preferably about 0.1 MPa or more, and about 0.15 MPa or more or about 0.2 MPa or more is further preferred.

Among these, at a transmembrane pressure difference of 100 kPa, a pure water flux of about 100 L/(m²·h) or more with a membrane internal pressure resistance of preferably about 0.3 MPa or more and external pressure resistance of preferably about 0.1 MPa or more is further preferred.

(Manufacturing Method)

Any of the methods for manufacturing polymer membranes for water treatment that are well known in the art can be used, such as the thermally-induced phase separation method (TIPS), non-solvent phase separation method (NIPS), the drawing method, and the like. Among these, manufacturing by the NIPS method is preferred.

For example, when employing the NIPS method, the resin solution is prepared from a good solvent and the material (resin) that constitutes the membrane, and optionally includes additives. Without being limiting in any particular way, a suitable choice of a good solvent in this case depends on the type of material (resin) or the like. Examples include dimethyl sulfoxide, N,N-dimethylformamide, tetrahydrofuran, N,N-dimethylacetamide, N-methyl-2-pyrrolidone, and the like.

Without being limiting the concentration and viscosity of the resin solution in this case in any particular way, a suitable viscosity is, for example, about 500-4000 mPa·s, and about 1000-3000 mPa·s is preferred. In this manner, it is possible to maintain the external circular shape of the hollow-fiber membrane in the spinning line, and a membrane of a uniform gauge and thickness can be manufactured.

Moreover, from another perspective, a preparation exhibiting a difference in specific gravity with a non-solvent mentioned below of within 1.0 is suitable, and it is preferably within 0.8, and further preferably within 0.2. In this manner, with the membrane itself floating or submerged in the coagulation tank, it is possible to effectively prevent the membrane from being flattened while being taken up.

To coagulate the abovementioned resin solution, normally, coagulation tank 30 as shown in FIG. 4 is used. Coagulation tank 30 is filled with a non-solvent.

Usually, to spin a resin solution, the spinneret used is equipped a discharge port having a concentrically-arranged double nozzle. This spinneret can be positioned inside or outside the coagulation tank, or extends from outside to inside to be able to spin into coagulation tank 30. For example, spinneret 31 provided with a discharge port (not shown in the figure) is positioned inside coagulation tank 30, in other words, immersed in non-solvent. In this manner, when spinneret 31 is positioned inside coagulation tank 30, the resin solution does not come into contact with air and is discharged directly into non-solvent, and since a liquid-liquid phase separation is initiated rapidly, giving a porous surface with no dense skin layer is produced on the surface. Specifically, superior water permeability is exhibited due to the reduction in filtration resistance. In addition, even with the spinning oriented horizontally as mentioned below, according to the design of the present invention with the spinneret immersed in the coagulation tank, for the normal continuous discharge of the resin solution, submerging the spinneret in the coagulation tank following the previous condition of the resin solution being discharged into the air can avoid the clogging associated with increased discharge resistance produced at the nozzle tip during initial spinning.

Even when the spinneret is positioned horizontally outside the coagulation tank, spinning can be oriented horizontally in the same manner as described in the present invention, and in this case the two procedures below for initiating spinning can be considered. For example, (1) a method wherein when non-solvent flows out continuously from an opening part in the side of the coagulation tank, the discharge port of the spinneret is introduced while resin solution is being discharged and the resin solution is guided into the coagulation tank, and (2) a method wherein the discharge port of the spinneret is positioned or fixed in the side of the coagulation tank beforehand after which discharge of the resin solution begins, and the resin solution is discharged into the coagulation tank.

In (1), the non-solvent flow and the flow of the resin solution from the discharge port of the spinneret are oriented in opposite directions, and the resin solution discharged from the spinneret discharge port experiences substantial discharge resistance when spinning is initiated. For this reason, congestion of the flow occurs in the vicinity of the spinneret discharge port, and this portion of the resin progressively solidifies, resulting in a high likelihood of occlusion in the spinneret discharge port.

In (2), the non-solvent in the coagulation tank prior to the start of spinning backwashes the spinneret discharge port through which resin solution should flow, and there is a high likelihood the resin solution will solidify in the spinneret discharge port part when spinning begins.

The result is that when the present invention is practiced industrially, there will be a significant reduction in workability when membrane manufacture begins. Additionally, a total or partial clogging in the discharge port by residues will interfere with the normal formation of the membrane, which is considered to cause a decrease in strength and a decrease in water permeability as a result. In light of this information, and taking into account the results of diligent study, the present inventors identified the most suitable procedure for immersion of the spinneret (discharge port) in the coagulation tank as an embodiment of the present invention.

The direction of discharge (FIG. 3, 32) of the resin solution from spinneret 31, in other words the direction in which the resin solution is expelled from the discharge port, for example, is preferably adjusted to be within ±30° (FIG. 3, 33) with respect to bottom 30a of coagulation tank 30. In other words, it is preferable for the resin solution to be discharged such that the direction of discharge is adjusted to be within ±30° with respect to the ground. Among these, it is further preferable to make adjustment such that the discharge is horizontal or nearly horizontal (about ±5°) with respect to coagulation tank 30a or the ground.

Heretofore, the system generally adopted has the resin solution discharged vertically from a spinneret, and since the overall outer diameter is less in the case of conventional hollow-fiber membranes, and conforms relatively flexibly even when the machine direction is changed, and thus doesn't cause deformation of the membrane such as flattening or bending.

On the other hand, according to the study by inventors up to the present, for polymer membranes for water treatment within the SDR value range that appears in the present invention to achieve a large outer diameter compared to conventional hollow-fiber membranes, in a discharge system with an angle in the aforementioned vertical direction or that exceeds the range shown in the present invention, serious shape defects such as membrane flattening and bending occur, and a significant reduction in strength will take place due to being overwhelmed by the already flexible condition of the polymer membrane for water treatment during solidification toward changes in the spinning direction. In addition to the abovementioned factual diligent study, the present inventors identified the most suitable procedure for carrying out spinning would be when, during the manufacture of the polymer membrane for water treatment shown in the present invention, the resin solution is discharged from a spinneret in a horizontal direction and the spinneret is immersed in a coagulation tank.

In other words, within the SDR value range shown in the present invention, wherein serious shape defects such as flattening of the membrane or bending are avoided, a single-layer membrane without having a support frame would have superior strength and water permeability, so that a polymer membrane for water treatment could be manufactured wherein the membrane terminus would not become clogged even with highly concentrated wastewater such as in bio-treated wastewater, and spinning can take place in the horizontal direction from a spinneret immersed in water.

The non-solvent with which the coagulation tank is filled can be suitably selected according to the abovementioned types of resin solution, for example, having water as a principal ingredient is preferred.

Since the non-solvent in the coagulation tank comes into direct contact with the resin solution, the difference in temperature between the resin solution discharged from the discharge port (or spinneret) and the non-solvent is preferably within about 100° C. In this manner, it is possible to avoid clogging in the vicinity of the spinneret discharge port due a sharp decrease in the temperature of the resin solution and a rapid increase in viscosity of the resin solution associated with a sharp decrease in the temperature of the resin solution. Additionally, by keeping the non-solvent at a fixed temperature, it is possible to maintain stable phase separation behavior in the resin solution, which can be manifested in stable properties such as water permeability and strength.

The take-up of the membrane during membrane manufacture generally is preferably carried out with a linear orientation. In the present invention, as mentioned above, by keeping the discharge port within ±30° of horizontal within the coagulation tank, there will be no change in the membrane take-up direction after the resin solution is discharged, and take-up will be easy while maintaining a fixed speed and uniform load. In this way, it is possible to minimize deformations in the membrane structure.

Cutting of the membrane after take-up can be done either inside or outside the coagulation tank. In particular, as shown in FIG. 4, when the cutting of membrane 34 occurs outside coagulation tank 30, cutting 35 is preferably carried out at cutting position 38 higher than position 37 of the discharge port of spinneret 31 in coagulation tank 30. In this manner, flow of the internal coagulation liquid from the tips of the discharged membrane due to siphoning effects will be prevented, which will minimize pressure changes in the internal coagulation liquid inside the membrane, and prevent not only flattening of the membrane shape but also variations in shape, which will have the effect of stabilizing the membrane shape. From this perspective, when cutting is carried out inside the coagulation tank, there is no particular limitation concerning this cutting position.

The polymer membrane for water treatment of the present invention has a superior balance between water permeability and physical strength. Consequently, when suitably employed as a separation membrane in existing water treatment systems, it enables suitable water treatment with the goal of water purification, and in particular the treatment of highly concentrated waste water. The polymer membrane for water treatment of the present invention having such characteristics can be suitably employed as and ultrafiltration (UF) membrane and a microfiltration (MF) membrane.

Although not limiting in any particular way, in addition to using the abovementioned polymer membrane for water treatment of the present invention, and depending on its object, purpose, and the like, the water treatment method of the present invention can be realized using any method well known in the art.

Examples include the use of immersion MBRs (membrane bioreactor method) that is being increasing adopted in recent years, wherein in this case, wastewater drawn in by pump undergoes biological treatment using activated sludge from an activated sludge treatment tank in units employing a hollow-fiber-shaped water treatment membrane. Here, the flow is introduced to the interior of the polymer membrane for water treatment shown in the present invention that is accommodated inside the unit, and water treatment can take place by inner pressure filtration by applying pressure from the inside of the membrane to the outside.

Moreover, for example, the use of the inside-out-type MBR shown in FIG. 2 is advantageous. For example, the method of separating water by passage of activated sludge through the hollow fibers of a polymer membrane for water treatment can be used. Specifically, an example of the separation method with activated sludge is shown, wherein wastewater is sequentially fed into anaerobic tank 11 as shown by arrow A and then into activated sludge tank 12, and after a predetermined purification in activated sludge tank 12, the activated sludge including the treated water is pumped out as shown by arrow B, and using water treatment module 10 with its ends sealed with sealing material 14 having a multiplicity of hollow-fiber water treatment membranes 13 accommodated in a circular casing, a water flow with a pressure load of 0.3 MPa or more of activated sludge containing treated water passes into the interior of the hollow fibers in hollow-fiber treatment membrane 13, with the treated water shown by arrow D passing through the hollow-fiber membrane and being separated. Furthermore, the separated sludge returns to activated sludge tank 12 as shown by arrow C, and is reused. The activated sludge concentration is preferably 3,000 ppm to 12,000 ppm.

The polymer membrane for water treatment according to the present invention will have a large inner diameter compared to conventional hollow-fiber membranes for water treatment while maintaining adequate strength, and when conducting an inside-out filtration of waste water with a comparatively high floc content such as bio-treated wastewater, the membrane end surface, in other words the membrane at the intake port where the wastewater is introduced, cannot become clogged. This is a characteristic that is not observed in conventional hollow-fiber-type membranes for water treatment.

WORKING EXAMPLES

Polymer membranes for water treatment and methods for their manufacture of the present invention are described in detail below based on working examples. Furthermore, the present invention is not limited in any way to these working examples.

Working Example 1

<<Membrane Manufacture>>

25 wt % chlorinated vinyl chloride resin (Sekisui Chemical Co., HA31K; degree of chlorination: 67%; degree of polymerization: 800) and 20 wt % poly(ethylene glycol) 400 as a pore formation aid were dissolved in dimethylacetamide. This resin solution was discharged continuously in a substantially level manner into a coagulation tank (filled with water) using a spinneret, and a porous hollow-fiber membrane was obtained due to phase separation in the coagulation tank.

As shown in FIG. 4, the spinning direction of membrane 34 was oriented to the horizontal, and in coagulation tank 30 (filled with water), 10 m was taken up in a straight line along the horizontal direction 36 from the discharge port of spinneret 31. Within about 1 m downstream therefrom, membrane 34 is raised up about 10 cm by roller 39, and cutting 35 is made by a cutting machine outside coagulation tank 30 and at cutting position 38 higher than position 37 of the discharge port of spinneret 31 which is inside coagulation tank 30.

<<Strength Evaluation>>

The membrane obtained has an outer diameter of 5.4 mm, and SDR value of 18 (inner diameter: 4.8 mm), and is of uniform shape without any cracks, bends, swelling, warping, or uneven thicknesses.

For the pressure resistance, internal pressure: 0.5 MPa; outer pressure: 0.3 MPa.

Additionally, the tensile strength was 33 N/fiber, and the tensile elongation at break was 50%.

In a radial cross-section, the proportion of surface area accounted for by pores was 75%. The pores in the outermost layer and innermost layer, respectively, had a width (length along the short axis direction; B in FIG. 1) of 10 μm, and the length (length along the long axis direction; A in FIG. 1) was 5% of the thickness. In the outer layer and inner layer, respectively, the width was 20 μm and the length was 40% of the thickness. Such pores, in other words, pores with a short axis dimension of 10-100 μm, will have a sum total of cross-sectional surface area for all pores of about 85%.

<<Evaluation of water Permeability>>

A hollow-fiber membrane single fiber was used to manufacture a water treatment module as shown in FIG. 2, and a pure water flux of 200 $L/m^2 \cdot hr \cdot atm$ was confirmed.

In addition, when a water permeability test was conducted using the device shown in FIG. 2 using activated sludge with an MLSS of 3000, a water permeability of 150-100 $L/m^2 \cdot hr \cdot atm$ was confirmed including the backwashing process. In the same manner, a water permeability of 180-150 $L/m^2 \cdot hr \cdot atm$ was confirmed for industrial wastewater with an SS of about 50.

Furthermore, bio-treated water with an MLSS of about 3000 means 3,000 mg/L of activated sludge suspended solids, while industrial wastewater with an SS of about 50 means 50 mg/L suspended solids.

Additionally, when filtration was carried out at 25° C. using an aqueous solution with a γ-globulin concentration of 100 ppm at 0.05 MPa internal pressure during treatment, the relative water permeability compared to pure water flux was about 80%. In this case, the globulin blocking rate was 99% or greater.

From the above results, in spite of the large aperture diameter, while the polymer membrane for water treatment of the present invention maintained an adequate internal and external water pressure resistance strength, a mechanical strength of 0.3 MPa or greater and water permeability of 100 $L/m^2 \cdot hr \cdot atm$, in particular a superior balance between water permeability and tensile strength was confirmed. In addition, occlusion due the deposition of solids is unlikely to occur, and it has been demonstrated that filtration is possible without pre-processing such as pre-filtration, precipitation, or the like, in the treatment of high-SS (high suspended solids) wastewater.

Working Example 2

<<Membrane Manufacture>>

25 wt % chlorinated vinyl chloride resin (Sekisui Chemical Co., HA31K; degree of chlorination: 67%; degree of polymerization: 800) and 20 wt % poly(ethylene glycol) 400 as a pore formation aid were dissolved in tetrahydrofurane. This resin solution was discharged continuously in a substantially level manner into a coagulation tank (filled with water) using a spinneret, and a porous hollow-fiber membrane was obtained due to phase separation in the coagulation tank.

As shown in FIG. 4, the spinning direction of membrane 34 was oriented to the horizontal, and in coagulation tank 30 (filled with water), 10 m was taken up in a straight line along the horizontal direction 36 from the discharge port of spinneret 31. Within about 1 m downstream therefrom, membrane 34 is raised up about 10 cm by roller 39, and cutting 35 is made by a cutting machine outside coagulation tank 30 and at cutting position 38 higher than position 37 of the discharge port of spinneret 31 which is inside coagulation tank 30.

<<Strength evaluation>>

The membrane obtained has an outer diameter of 5.1 mm, and SDR value of 8.5, and is of uniform shape without any cracks, bends, swelling, warping, or uneven thicknesses.

For the pressure resistance, internal pressure: 0.9 MPa; outer pressure: 0.4 MPa.

Additionally, the tensile strength was 45 N/fiber, and the tensile elongation at break was 50%.

<<Evaluation of Water permeability>>

A hollow-fiber membrane single fiber was used to manufacture a water treatment module as shown in FIG. 2, and a pure water flux of 120 $L/m^2 \cdot hr \cdot atm$ was confirmed.

In addition, when a water permeability test was conducted using the device shown in FIG. 2 using activated sludge with an MLSS of 3000, a water permeability of 100-50 $L/m^2 \cdot hr \cdot atm$ was confirmed including the backwashing process. In the same manner, a water permeability of 110-80 $L/m^2 \cdot hr \cdot atm$ was confirmed for industrial wastewater with an SS of about 50.

When filtration was carried out at 25° C. using an aqueous solution with a γ-globulin concentration of 100 ppm at 0.05 MPa internal pressure during treatment, the relative water permeability compared to pure water flux was about 80%. In this case, the globulin blocking rate was 99% or greater.

Working Example 3

<<Membrane Manufacture>>

22 wt % chlorinated vinyl chloride resin (Sekisui Chemical Co., HA05K; degree of chlorination: 67%; degree of polymerization: 500) and 22 wt % poly(ethylene glycol) 400 as a pore formation aid were dissolved in dimethylacetamide. This resin solution was discharged continuously in a substantially level manner into a coagulation tank (filled with water) using a spinneret, and a porous hollow-fiber membrane was obtained due to phase separation in the coagulation tank.

As shown in FIG. 4, the spinning direction of membrane 34 was oriented to the horizontal, and in coagulation tank 30 (filled with water), 10 m was taken up in a straight line along the horizontal direction 36 from the discharge port of spinneret 31. Within about 1 m downstream therefrom, membrane 34 is raised up about 10 cm by roller 39, and cutting 35 is made by a cutting machine outside coagulation tank 30 and at cutting position 38 higher than position 37 of the discharge port of spinneret 31 which is inside coagulation tank 30.

<<Strength Evaluation>>

The membrane obtained has an outer diameter of 4.6 mm, and SDR value of 5.8, and is of uniform shape without any cracks, bends, swelling, warping, or uneven thicknesses.

For the pressure resistance, internal pressure: 0.7 MPa; outer pressure: 0.5 MPa.

Additionally, the tensile strength was 40 N/fiber, and the tensile elongation at break was 50%.

<<Evaluation of Water Permeability>>

A hollow-fiber membrane single fiber was used to manufacture a water treatment module as shown in FIG. 2, and a pure water flux of 450 L/m$^2$·hr·atm was confirmed.

In addition, when a water permeability test was conducted using the device shown in FIG. 2 using activated sludge with an MLSS of 3000, a water permeability of 300-200 L/m$^2$·hr·atm was confirmed including the backwashing process. In the same manner, a water permeability of 400-300 L/m$^2$·hr·atm was confirmed for industrial wastewater with an SS of about 50.

When filtration was carried out at 25° C. using an aqueous solution with a γ-globulin concentration of 100 ppm at 0.05 MPa internal pressure during treatment, the relative water permeability compared to pure water flux was about 80%. In this case, the globulin blocking rate was 99% or greater.

Comparative Example 1

High SDR

<<Membrane Manufacture>>

25 wt % chlorinated vinyl chloride resin (Sekisui Chemical Co., HA31K; degree of chlorination: 67%; degree of polymerization: 800) and 20 wt % poly(ethylene glycol) 400 as a pore formation aid were dissolved in dimethylacetamide. This resin solution was discharged continuously in a substantially level manner into a coagulation tank (filled with water) using a spinneret, and a porous hollow-fiber membrane was obtained due to phase separation in the coagulation tank.

As shown in FIG. 4, the spinning direction of membrane 34 was oriented to the horizontal, and in coagulation tank 30 (filled with water) 10 m was taken up in a straight line along the horizontal direction 36 from the discharge port of spinneret 31. Within about 1 m downstream therefrom, membrane 34 is raised up about 10 cm by roller 39, and cutting 35 is made by a cutting machine outside coagulation tank 30 and at cutting position 38 higher than position 37 of the discharge port of spinneret 31 which is inside coagulation tank 30.

<<Strength Evaluation>>

The membrane obtained has an outer diameter of 5.1 mm, and SDR value of 40, and is of uniform shape without any cracks, bends, swelling, warping, or uneven thicknesses.

However, the pressure resistance was, internal pressure: 0.2 MPa; outer pressure: 0.08 MPa, and the properties of a water treatment membrane could not be demonstrated.

Comparative Example 2

Vertical Extrusion

<<Membrane Manufacture>>

25 wt % chlorinated vinyl chloride resin (Sekisui Chemical Co., HA31K; degree of chlorination: 67%; degree of polymerization: 800) and 20 wt % poly(ethylene glycol) 400 as a pore formation aid were dissolved in dimethylacetamide. This resin solution was discharged continuously substantially in a vertical manner into a coagulation tank (filled with water) using a spinneret, and a porous hollow-fiber membrane was obtained due to phase separation in the coagulation tank.

As shown in FIG. 5, with a vertical spinning orientation, membrane 40a is introduced into coagulation tank 30 (filled with water) through a 3 cm air gap, and 1 meter downstream from the spinneret, the machine direction for membrane 40a is changed by 300° using guide roller 41, and then again the machine direction of membrane 40b is changed by 30° using guide roller 42, and take-up is in a straight line of about 8 m. At about 1 m downstream therefrom, membrane 34 is raised up about 10 cm by roller 39, and cutting 35 is made by a cutting machine outside coagulation tank 30 and at cutting position 38 higher than position 37 of the discharge port of spinneret 31 inside coagulation tank 30.

<<Strength Evaluation>>

The membrane obtained has an outer diameter of 5.4 mm, and SDR value of 18, and the shape is non-uniform with cracks, bends, swelling, warping, and uneven thicknesses.

Working Examples 1 to 3 and Comparative Examples 1 to 2 are illustrated in Table 1.

TABLE 1

| | Inner diameter (mm) | Outer diameter (mm) | SDR value | Internal/external pressures (MPa) | Water permeability (L/m$^2$·hr·atm) | γ-globulin blocking rate |
|---|---|---|---|---|---|---|
| Ex. 1 | 4.8 | 5.4 | 18.0(3) | 0.5/0.3 | 200 | 99% |
| Ex. 2 | — | 5.1 | 8.5 | 0.9/0.4 | 120 | 99% |
| Ex. 3 | — | 4.6 | 5.8 | 0.7/0.5 | 450 | 99% |
| Comp. Ex. 1 | — | 5.1 | 40.0 | — | — | — |
| Comp. Ex. 2 | — | 5.4 | 18.0 | — | — | — |

Working Example 4

CPVC <<Membrane Manufacture>>

18 wt % chlorinated vinyl chloride resin (Sekisui Chemical Co., HA31K; degree of chlorination: 67%; degree of polymerization: 800) and 15 wt % polyvinylpyrrolidone as a pore formation aid were dissolved in dimethylacetamide.

This resin solution was discharged continuously in a substantially level manner into a coagulation tank (filled with water) using a spinneret, and a porous hollow-fiber membrane was obtained due to phase separation in the coagulation tank.

As shown in FIG. 4, the spinning direction of membrane 34 was oriented to the horizontal, and in coagulation tank 30 (filled with water), 10 m was taken up in a straight line along the horizontal direction 36 from the discharge port of spinneret 31. Within about 1 m downstream therefrom, membrane 34 is raised up about 10 cm by roller 39, and cutting 35 is made by a cutting machine outside coagulation tank 30 and at cutting position 38 higher than position 37 of the discharge port of spinneret 31 which is inside coagulation tank 30.

<<Strength Evaluation>>

The membrane obtained has an outer diameter of 5.6 mm, and SDR value of 11.2, and is of uniform shape without any cracks, bends, swelling, warping, or uneven thicknesses.

For the pressure resistance, internal pressure: 0.6 MPa; outer pressure: 0.4 MPa.

<<Evaluation of Water Permeability>>

A hollow-fiber membrane single fiber was used to manufacture a water treatment module as shown in FIG. 2, and a pure water flux of 300 L/m$^2$·hr·atm was confirmed.

In addition, when a water permeability test was conducted using the device shown in FIG. 2 using activated sludge with an MLSS of 3000, a water permeability of 150-100 L/m$^2$·hr·atm was confirmed including the backwashing process. In the same manner, a water permeability of 250-200 L/m$^2$·hr·atm was confirmed for industrial wastewater with an SS of about 50.

When filtration was carried out at 25° C. using an aqueous solution with a γ-globulin concentration of 100 ppm at 0.05 MPa internal pressure during treatment, the relative water permeability compared to pure water flux was about 80%. In this case, the globulin blocking rate was 99% or greater.

These results are illustrated in Table 2.

Working Example 5

CA

<<Membrane Manufacture>>

24 wt % cellulose triacetate and 15.4 wt % triethylene glycol as a pore formation aid were dissolved in N-methyl-2-pyrrolidone. This resin solution was discharged continuously in a substantially level manner into a coagulation tank (filled with water) using a spinneret, and a porous hollow-fiber membrane was obtained due to phase separation in the coagulation tank.

As shown in FIG. 4, the spinning direction of membrane 34 was oriented to the horizontal, and in coagulation tank 30 (filled with water), 10 m was taken up in a straight line along the horizontal direction 36 from the discharge port of spinneret 31. Within about 1 m downstream therefrom, membrane 34 is raised up about 10 cm by roller 39, and cutting 35 is made by a cutting machine outside coagulation tank 30 and at cutting position 38 higher than position 37 of the discharge port of spinneret 31 which is inside coagulation tank 30.

<<Strength Evaluation>>

The membrane obtained has an outer diameter of 5.6 mm, and SDR value of 11.2, and is of uniform shape without any cracks, bends, swelling, warping, or uneven thicknesses.

For the pressure resistance, internal pressure: 0.5 MPa; outer pressure: 0.3 MPa.

<<Evaluation of Water Permeability>>

A hollow-fiber membrane single fiber was used to manufacture a water treatment module as shown in FIG. 2, and a pure water flux of 700 L/m$^2$·hr·atm was confirmed.

In addition, when a water permeability test was conducted using the device shown in FIG. 2 using activated sludge with an MLSS of 3000, a water permeability of 400-300 L/m$^2$·hr·atm was confirmed including the backwashing process. In the same manner, a water permeability of 600-500 L/m$^2$·hr·atm was confirmed for industrial wastewater with an SS of about 50.

When filtration was carried out at 25° C. using an aqueous solution with a γ-globulin concentration of 100 ppm at 0.05 MPa internal pressure during treatment, the relative water permeability compared to pure water flux was about 80%. In this case, the globulin blocking rate was 99% or greater.

These results are illustrated in Table 2.

Working Example 6

PES

<<Membrane Manufacture>>

22 wt % polyether sulfone and 5 wt % polyvinylpyrrolidone as a pore formation aid were dissolved in N-methyl-2-pyrrolidone. This resin solution was discharged continuously in a substantially level manner into a coagulation tank (filled with water) using a spinneret, and a porous hollow-fiber membrane was obtained due to phase separation in the coagulation tank.

As shown in FIG. 4, the spinning direction of membrane 34 was oriented to the horizontal, and in coagulation tank 30 (filled with water), 10 m was taken up in a straight line along the horizontal direction 36 from the discharge port of spinneret 31. Within about 1 m downstream therefrom, membrane 34 is raised up about 10 cm by roller 39, and cutting 35 is made by a cutting machine outside coagulation tank 30 and at cutting position 38 higher than position 37 of the discharge port of spinneret 31 which is inside coagulation tank 30.

<<Strength Evaluation>>

The membrane obtained has an outer diameter of 5.6 mm, and SDR value of 11.2, and is of uniform shape without any cracks, bends, swelling, warping, or uneven thicknesses.

For the pressure resistance, internal pressure: 0.5 MPa; outer pressure: 0.3 MPa.

<<Evaluation of Water Permeability>>

A hollow-fiber membrane single fiber was used to manufacture a water treatment module as shown in FIG. 2, and a pure water flux of 300 L/m$^2$·hr·atm was confirmed.

In addition, when a water permeability test was conducted using the device shown in FIG. 2 using activated sludge with an MLSS of 3000, a water permeability of 200-150 L/m$^2$·hr·atm was confirmed including the backwashing process. In the same manner, a water permeability of 250-200 L/m$^2$·hr·atm was confirmed for industrial wastewater with an SS of about 50.

When filtration was carried out at 25° C. using an aqueous solution with a γ-globulin concentration of 100 ppm at 0.05 MPa internal pressure during treatment, the relative water permeability compared to pure water flux was about 80%. In this case, the globulin blocking rate was 99% or greater.

These results are illustrated in Table 2.

TABLE 2

|  | Outer diameter (mm) | SDR value | Internal/external pressures (MPa) | Water permeability (L/m² · hr · atm) |
|---|---|---|---|---|
| Ex. 4 | 5.6 | 11.2 | 0.8/0.5 | 300 |
| Ex. 5 | 5.6 | 11.2 | 0.5/0.3 | 700 |
| Ex. 6 | 5.6 | 11.2 | 0.5/0.3 | 300 |

Working Examples 7 to 14

Strength and SDR

<<Membrane Manufacture>>

18 wt % chlorinated vinyl chloride resin (Sekisui Chemical Co., HA31K; degree of chlorination: 67%; degree of polymerization: 800) and 15 wt % polyvinylpyrrolidone as a pore formation aid were dissolved in dimethylacetamide. This resin solution was discharged continuously in a substantially level manner into a coagulation tank (filled with water) using a spinneret, and a porous hollow-fiber membrane was obtained due to phase separation in the coagulation tank. At that time, discharge rate of the resin solution, discharge rate of the inner coagulation solution, taking up speed, and the like are changed and membranes of various shape were made.

As shown in FIG. 4, the spinning direction of membrane 34 was oriented to the horizontal, and in coagulation tank 30 (filled with water), 10 m was taken up in a straight line along the horizontal direction 36 from the discharge port of spinneret 31. Within about 1 m downstream therefrom, membrane 34 is raised up about 10 cm by roller 39, and cutting 35 is made by a cutting machine outside coagulation tank 30 and at cutting position 38 higher than position 37 of the discharge port of spinneret 31 which is inside coagulation tank 30.

<<Strength Evaluation>>

The membranes obtained have an outer diameter of 3.8-10 mm, and SDR value of 7-16, and is of uniform shape without any cracks, bends, swelling, warping, or uneven thicknesses.

The outer diameter, SDR value, and internal pressure and outer pressure were illustrated in Table 3.

<<Evaluation of Water Permeability>>

A hollow-fiber membrane single fiber was used to manufacture a water treatment module as shown in FIG. 2, and a pure water flux of 300 L/m²·hr·atm was confirmed for all membranes.

In addition, when a water permeability test was conducted using the device shown in FIG. 2 using activated sludge with an MLSS of 3000, a water permeability of 200-150 L/m²·hr·atm was confirmed including the backwashing process. In the same manner, a water permeability of 250-300 L/m²·hr·atm was confirmed for industrial wastewater with an SS of about 50.

TABLE 3

|  | Outer diameter (mm) | SDR value | Internal/external pressures (MPa) | Water permeability (L/m² · hr · atm) |
|---|---|---|---|---|
| Ex. 7 | 4.5 | 7 | 1/0.65 | 310 |
| Ex. 8 | 3.8 | 13 | 0.5/0.3 | 280 |
| Ex. 9 | 5.3 | 16 | 0.55/0.2 | 330 |
| Ex. 10 | 6.7 | 8 | 1/0.6 | 290 |
| Ex. 11 | 5.8 | 15 | 0.4/0.2 | 310 |
| Ex. 12 | 7.9 | 11 | 0.9/0.5 | 300 |
| Ex. 13 | 8.5 | 13 | 0.6/0.3 | 290 |
| Ex. 14 | 10.0 | 8 | 1/0.6 | 280 |

Working Example 15

Cutting Height

A hollow-fiber membrane was manufactured using the same method as in Working Example 1 except that after take-up of the membrane in the horizontal direction, the height of the membrane was not changed but remained as is for the cutting made by the cutting machine in the coagulation tank.

The results were confirmed as exhibiting substantially the same characteristics as in Working Example 1.

Working Example 16

Upward 20°

A hollow-fiber membrane was manufactured using the same method as in Working Example 1 except that the membrane spinning direction was upward 20°, the membrane was taken up in a straight line, and the cutting was made in the coagulation tank without changing the existing orientation or height. The results were confirmed as exhibiting substantially the same characteristics as in Working Example 1.

Working Example 17

Downward 20°

A hollow-fiber membrane was manufactured using the same method as in Working Example 1 except that membrane spinning direction was downward 20°, the membrane was taken up in a straight line, and the cutting was made in the coagulation tank without changing the existing orientation or height. The results were confirmed as exhibiting substantially the same characteristics as in Working Example 1.

Comparative Example 3

Upward of 45°

A hollow-fiber membrane was manufactured using the same method as in Working Example 1 except that membrane spinning direction was upward 45°, the membrane was taken up in a straight line, and the cutting was made in the coagulation tank without changing the existing orientation or height. However, the membrane obtained has the shape that is non-uniform with swelling, warping, and uneven thicknesses relative to Working Example 1.

Comparative Example 4

Downward 45°

A hollow-fiber membrane was manufactured using the same method as in Working Example 1 except that membrane spinning direction was downward 45°, the membrane was taken up in a straight line, and the cutting was made in the coagulation tank without changing the existing orientation or height. However, the membrane obtained has the shape that is non-uniform with swelling, warping, and uneven thicknesses relative to Working Example 1.

INDUSTRIAL APPLICABILITY

Regardless of aspect of a water treatment device, the present invention can be widely-used as a membrane for water treatment and a microfiltration membrane for purifying water, such as for removing turbidity from river water and groundwater, clarification of industrial water, treatment of wastewater and sewage, and as a pretreatment for seawater desalination, and the like, in particular, it is used with advantage for MBR.

DESCRIPTION OF THE NUMERALS 10 water treatment module
11 anaerobic tank
12 activated sludge tank
13 hollow-fiber water treatment membranes
14 sealing material
20 hollow fiber membrane
20a outermost layer
20b outer layer
20c inner layer
20d innermost layer
21 pore
21a, 21b, 21c, 21d pore
A long axis of pore
B short axis of pore
30 coagulation tank
30a bottom
31 spinneret
32 direction of discharge
33 angle of discharge
34, 40a, 40b membrane
35 cutting
36 horizontal direction
37 position of the discharge port
38 cutting position
39 roller
41, 42 guide roller

The invention claimed is:

1. A method for the manufacture of a polymer membrane for water treatment comprising;
   preparing a resin solution having a viscosity of 500 to 4000 mPa·s,
   using a spinneret provided with a discharge port,
   after preparing the resin solution, discharging the resin solution from the spinneret into air, and then submerging the spinneret in a coagulation tank while the resin solution is being discharged, and
   coagulating the resin solution by discharging from a discharge port into the coagulation tank at within ±30° of horizontal with respect to the ground, wherein the coagulation tank contains a non-solvent, and wherein the resin solution and the non-solvent have a difference in temperature of within 100° C.,
   the polymer membrane comprising a hollow fiber membrane having a self-supporting design composed of a substantially single principal structural material,
   with an outer diameter of 3.6 mm to 10 mm and
   a ratio of outer diameter to thickness, SDR, of 5.8 to 34,
   fractionation properties of an ultrafiltration membrane or a microfiltration membrane, and
   pure water flux of 100 L/m$^2$·hr·atm or greater.

2. The method for the manufacture of a polymer membrane for water treatment according to claim 1, which further comprises;
   cutting the membrane obtained within the coagulation tank, or
   cutting the membrane outside the coagulation tank at a position higher than the discharge port.

3. The method for the manufacture of a polymer membrane for water treatment according to claim 1, wherein the difference in specific gravity between the resin solution and the non-solvent is within 1.0.

* * * * *